United States Patent
Malmin et al.

(10) Patent No.: US 8,119,980 B2
(45) Date of Patent: Feb. 21, 2012

(54) SELF-ADAPTIVE TUNING OF GAMMA CAMERA

(75) Inventors: Ronald E. Malmin, Chicago, IL (US); James Frank Caruba, Bartlett, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 12/984,029

(22) Filed: Jan. 4, 2011

(65) Prior Publication Data

US 2011/0095172 A1    Apr. 28, 2011

Related U.S. Application Data

(62) Division of application No. 11/863,568, filed on Sep. 28, 2007, now abandoned.

(60) Provisional application No. 60/848,241, filed on Sep. 28, 2006.

(51) Int. Cl.
*G12B 13/00* (2006.01)

(52) U.S. Cl. .................................. 250/252.1

(58) Field of Classification Search ................ 250/252.1
See application file for complete search history.

(56) References Cited

U.S. PATENT DOCUMENTS

| | | | |
|---|---|---|---|
| 4,857,722 A * | 8/1989 | Kumazawa et al. | 250/207 |
| 5,512,755 A | 4/1996 | Vickers et al. | |
| 5,677,536 A | 10/1997 | Vickers | |
| 6,835,935 B2 | 12/2004 | Engdahl et al. | |
| 7,005,646 B1 | 2/2006 | Jordanov et al. | |
| 7,071,474 B2 | 7/2006 | Wong et al. | |

* cited by examiner

*Primary Examiner* — David Porta
*Assistant Examiner* — Shun Lee
(74) *Attorney, Agent, or Firm* — Peter L. Kendall (57) ABSTRACT

An improved system and method for tuning individual sensors (e.g., photomultiplier tubes) of a multi-sensor imaging system such as e.g., a gamma camera having an array of photo-multiplier tubes is provided that produces a uniform response over the entire system. Individual sensors of a multi-sensor imaging system are tuned based explicitly or implicitly on gain characteristics of individual sensors of the multi-sensor imaging system so as to produce a uniform response over the system.

3 Claims, 5 Drawing Sheets

SELF-ADAPTIVE TUNING OF GAMMA CAMERA

CROSS-REFERENCE TO RELATED APPLICATIONS

This application is a divisional of U.S. Ser. No. 11/863,568 filed on Sep. 28, 2007, which claims priority under 35 U.S.C. §119(e) from provisional application 60/848,241 filed Sep. 28, 2006, the entire contents of which are incorporated herein by reference.

BACKGROUND

1. Field of the Invention

The present invention generally relates to a system and method for calibrating and tuning a gamma ray camera ("gamma camera").

2. Discussion of the Background

Gamma cameras are primarily used by physicians and medical practitioners who specialize in the field of nuclear medicine. Nuclear medicine is a unique medical specialty wherein low-level radioactive materials (called radionuclides or radiopharmaceuticals) are used to generate images of the organs, bones or tissues of the body. The images generated by gamma cameras are primarily used to determine whether organs or tissues are functioning properly.

Typically, the radionuclides or radiopharmaceuticals are introduced orally or intravenously into the body of a patient. Radiopharmaceuticals are specially formulated to collect temporarily in a specific part of the body to be studied, such as the patient's heart or brain. Once the radiopharmaceuticals reach the intended organ, they emit gamma rays that are then detected and measured by the gamma camera.

A typical gamma camera includes a large area scintillation crystal, which functions as a gamma ray detector. The crystal is typically sodium iodide doped with a trace of thallium (NaI(T1)). The crystal converts high-energy photons (e.g., gamma rays and X-rays) into visible light (i.e., lower energy photons). The crystal is positioned to receive a portion of the gamma ray emissions from the radiopharmaceutical in the body.

When a gamma ray strikes and is absorbed in the scintillation crystal, the energy of the gamma ray is converted into flashes of light (i.e., a large number of scintillation photons) that emanate from the point of the gamma ray's absorption in the scintillation crystal. A photo-multiplier tube (PMT), which is optically coupled to the scintillation crystal, detects a fraction of these scintillation photons and produces an output electronic signal (e.g., current or voltage pulse) having an amplitude that is proportional to the number of detected scintillation photons. The gamma ray camera typically has a plurality of photomultiplier tubes placed in a two dimensional array, with the signals from the different photomultiplier tubes being combined to provide an indication of the positions and energies of detected gamma rays.

The scintillation photons emitted from the detector crystal are typically in the visible light region of the electromagnetic spectrum (such as with a mean value of about 3 eV for NaI(T1)). The scintillation photons spread out from the point of emission. A large fraction of the scintillation photons are transported from the point of emission to a light sensitive surface, called the photocathode, of the PMTs. A fraction of the scintillation photons incident on the photocathodes cause an electron to be emitted from the photocathode. The electron, also called a photoelectron, is then electrostatically accelerated into an electron-multiplying structure of the PMT, which causes an electrical signal to be developed at an output of the PMT. The amplitude of the electrical signal is proportional to the number of photoelectrons generated in the PMT during the time period that scintillation photons are being emitted. Thus, after a gamma ray absorption event, the PMT outputs an electrical signal that can be used with other signals from other PMTs to determine the location of the gamma ray absorption event.

The number of scintillation photons producing electrical signals in each PMT is inversely related to the distance of the PMT from the point of gamma ray absorption, or event location. It is because of this relationship that the position of the event can be calculated from the signals of the PMTs surrounding the event location.

Ideally, the signal derived from each PMT should have exactly the same proportional relationship to the distance from the event location as for all other PMTs. In addition to distance from the event location, the amplitudes of the signals derived from each PMT are proportional to two basic parameters: 1) the number of scintillation photons detected by a PMT, and 2) the gain or amplification of the PMT. Therefore, accuracy to which the position of the event location can be calculated depends on these two factors remaining constant over time.

Typically, a gamma camera is tuned prior to its operation so as to ensure that the camera will calculate accurately the positions of event locations anywhere within an area called the field of view (FOV). Common commercial, large FOV gamma cameras have between about 50 and 100 PMTs. A tuning procedure will typically require a number of steps that balance or equalize the signal amplitudes of the PMTs. The gains of the PMTs are adjusted such that the sum of the signals from all the PMTs are approximately equal in response to a fixed energy gamma event, regardless of the location of the event.

To tune a gamma camera according to known protocol, a known pattern of event locations is presented to the camera, usually by placing a mask of precisely spaced holes over the camera crystal, so that event location calculations can be calibrated to provide the known locations fixed by the positions of the holes, where the gamma rays can pass through the mask. The exact tuning and/or calibration steps may be different among cameras produced by different manufacturers. However, once the tuning and calibration steps are complete, the image quality, which depends on the camera's ability to accurately position event locations, depends on the transport of scintillation light to the PMTs and the gains of the PMTs remaining unchanged from the time when the tuning and calibration procedures were performed.

A number of factors can cause a change in either the gain of a PMT or the light collection properties of the camera. PMT gain is a strong function of temperature, counting rate (i.e., the number of event signals per unit time), and the high voltage (HV) power supply regulation. Additionally, PMTs change their gain over time as they age. The light collection from the crystal to the photocathodes of the PMTs can change if the transmissive properties of lightguide surfaces change. For example, the PMTs are optically coupled to a glass or plastic lightpipe using either an optical grease or epoxy. If any of these materials' light transmissive properties change over time, then the transport of scintillation photons to the PMT will change. Additionally, NaI(T1) is a hygroscopic material, and if water vapor reaches the crystal it becomes yellow and the light transmission is diminished.

Different manufacturers have developed and implemented different means to maintain the constancy of PMT gains. These means typically fall into two categories: 1) automatic (i.e., not requiring the user to initiate the process), and 2) user quality control (QC) procedures (i.e., procedures initiated by the user). Generally, a combination of both automatic and QC procedures has been required.

One automatic system, for example, utilizes light-emitting diodes (LEDs) coupled into the photomultiplier tubes to provide a light signal for calibration of each individual tube. A constant fraction of the light emitted by the LED is incident on the light-sensitive photocathode of the PMT. The PMT output signal is checked against a reference that was set at the time of the last calibration. The gain of the PMT is adjusted if the measured signal has strayed from the reference.

This gain calibration technique depends on the light-emitting diodes having a constant light output for each pulse. Light-emitting diodes, however, do not have constant light output as a function of temperature, and may also vary over the lifetime of the diode. Another drawback of this technique of automatic calibration is that the light from the diode is mostly directly incident on the photocathode of the photomultiplier tube. Therefore, the transport of the light through the scintillation crystal, and associated optical elements, is not significantly sampled by the pulse of light from the diode.

User-initiated QC procedures usually require the placement of a radioactive source to uniformly illuminate the camera. The system acquires an appropriate number of events to achieve statistically significant sampling of each event location. A computer program then analyzes the measured energies and/or image of event locations to determine whether or not the system has drifted away from the properly calibrated state. Many variations of this procedure are possible, but all typically require the user to position a source of radioactivity and initiate the computer controlled acquisition and analysis. Additionally, the procedures also typically require the user to remove the collimator from the camera.

Such QC procedures are cumbersome to the user. If they can be initiated at the end of the day, and complete themselves automatically, then the user's time required is minimal. However, radioactive sources that must be left out in a room overnight require institutional procedures for securing the room, logging out the source and returning it in the morning, and prohibiting access to the room by cleaning and unauthorized personnel. Performing QC procedures during working hours reduces available patient imaging time on the system and increases costs because personnel are not doing patient imaging.

The present invention improves upon prior systems and methods, including, e.g., the systems and methods described in the following patents:

1. U.S. Pat. No. 7,071,474, entitled Methods and Apparatus for Tuning Scintillation Detectors;
2. U.S. Pat. No. 7,005,646, entitled Stabilized Scintillation Detector for Radiation Spectroscopy and Method; and
3. U.S. Pat. No. 6,835,935, entitled System and Method for Calibrating and Tuning a Gamma Camera.

For reference, U.S. Pat. No. 6,835,935, assigned to the same assignee herein and incorporated herein by reference, teaches a system and method that is designed to calibrate and tune a gamma camera with minimal or no human intervention. The '935 system and method provides a valuable feature for the user in that the user is assured of optimal performance of the camera without requiring laborious procedures and expenditures of time that might otherwise be devoted to patient imaging. With the '935 system and method, analysis of PMT output pulses and calibration can be totally automatic. First, in one embodiment, the user does not need to handle a radioactive source because such sources can be made part of the camera. Second, the system computer can be programmed to monitor continuously the count rate and, thereby, determine when the system is being used and when the system is idle. When the system is idle (i.e., the count rate is approximately equal to the natural background plus the contribution of the radioactive sources), the system computer can automatically monitor and record individual PMT signals. When a sufficient number of data points have been stored for each PMT, the mean amplitude and variance of each tube's response to the events can be calculated. These calculated values may be compared to baseline values (e.g., values that were calculated at the time of the last tuning and calibration of the system, providing a database for comparison) and/or to calculated values associated with neighboring PMTs to determine whether and to what extent adjustments to the camera need to made. Further, the software may be programmed to analyze the results of the comparisons and automatically make the necessary PMT gain adjustments.

Figure 1:
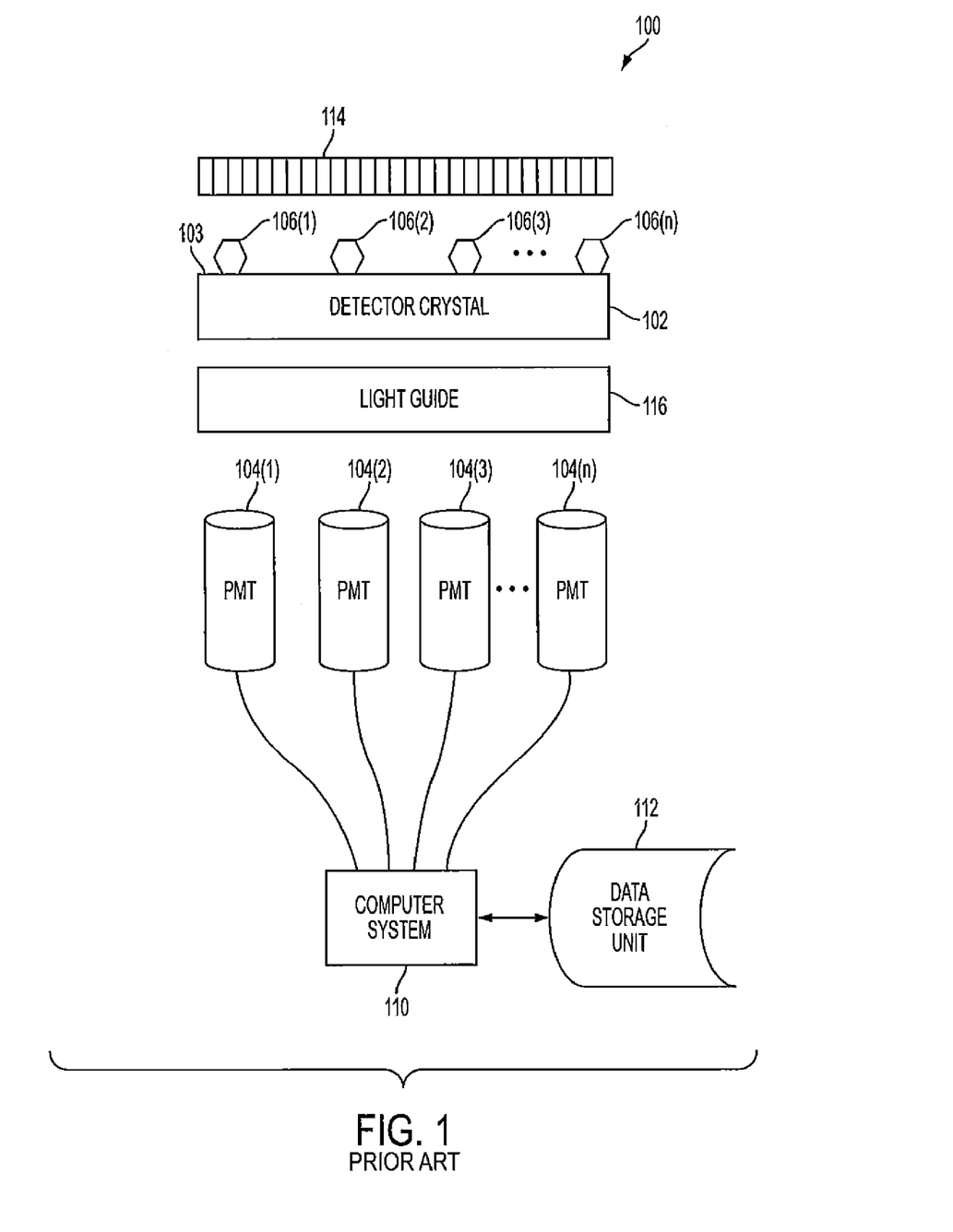
FIG. 1 is an illustrative gamma camera system according to the prior art illustrating an exemplary environment within which some illustrative embodiments of the present invention can be implemented.

FIG. 1 is a diagram illustrating certain components of a gamma camera 100 according to one embodiment of the '935 system and method. As shown in FIG. 1, gamma camera 100 includes a scintillation crystal 102 (or "detector crystal 102"), a number of photomultiplier tubes (PMTs) 104(a) . . . (n), and a computer system 110 coupled to the output of each PMT 104. Advantageously, one or more very weak radioactive sources 106(a) . . . (n) is placed so as to be facing an entrance window side 103 of scintillation crystal 102 at fixed or known locations. Gamma camera 100 may also include a collimator 114 and a light guide 116. In one embodiment, sources 106 are positioned between collimator 114 and crystal 102. Data storage unit 112 stores data points for each PMT 104.

In one embodiment, sources 106 are positioned adjacent to the entrance window side 103 of scintillation crystal 102 at fixed or known locations. In a preferred embodiment, sources 106 are permanently or detachably affixed to entrance window side 103 of scintillation crystal 102 or to another component of camera 100, such as collimator 114. In a particular embodiment, a user of the camera 100 need not manually position sources 106 to occupy the fixed locations. For example, the sources may be pre-positioned and affixed to a component of camera 100 as part of the manufacturing process of the camera.

Sources 106 are chosen to have a photon energy that is below the source energies typical of diagnostic imaging, which are typically at least 140 keV. The source activity is also chosen to be below the limits set by regulatory agencies which would require licensing and inventory control. For example, Americium-241 (Am-241) emits a 60 keV X-ray and a long half-life. For activity levels less than 10 nCi, (nanocuries) such sources do not require radioactive material licenses.

Each radioactivity source 106, which is placed in a fixed location, causes scintillation photons to emanate from a small region directly "below" the source whenever an X-ray from the source 106 enters crystal 102. The scintillation photons produced by the X-rays will produce electronic signals of small amplitude in the photomultiplier tubes 104. Since the source activity is small, the probability of two absorption events overlapping in time is of negligible consequence.

The scintillation photons generated from each absorption event can be assumed to be located at a known point in the crystal 102 because each source 106 is placed in a fixed location and the range of the low energy photons (i.e., X-rays) within the scintillation crystal is short (e.g., <1 mm). Additionally, the mean number of scintillation photons produced from each X-ray absorption event will be near constant. Therefore, the signals produced in nearby PMTs, resultant from a number of scintillation photons generated from a single, mono energetic X-ray absorption and subsequently transported to the PMTs, will be random statistical variants about constant means, modified by any changes in light transport and PMT response and amplification (i.e. gain).

Because the PMT output signal caused by one of the sources 106 should be a random statistical variant about a constant mean, absent changes in light collection and absent changes in the PMT itself, a process 200, which is illustrated in FIG. 2 of the '935 patent, can be used to determine whether such changes have occurred and can be used tune PMTs 104 to compensate for the changes. Process 200 assumes a single source 106, but multiple sources may be used.

Although a number of methods of tuning gamma cameras are known, there continues to exist a need for improved systems and methods.

SUMMARY OF THE INVENTION

The preferred embodiments of the present invention provide substantial advancements over existing systems and methods for tuning of gamma cameras and/or other imaging systems.

In the preferred embodiments, a novel algorithm and methodology is provided that enables the "tuning" of the individual sensors of a multi-sensor imaging system in order to, among other things, produce a more uniform response over the entire system. In the preferred embodiments, the methodologies are implemented within a gamma ray imaging system that includes an array of photomultiplier tubes (PMTs). However, in various other embodiments, the algorithm and methodology can be employed in other environments. In this regard, concepts of the present invention are generalized and can be applied in other applications.

In preferred embodiments, it is needed that the gains of the individual photomultiplier tubes be adjusted in such a way as to produce the same or substantially the same total energy signal over the entire or substantially the entire imaging area of the camera. In some preferred embodiments, an algorithm is employed that has, e.g., the following characteristics:

An ability to work with PMTs with widely varying, non-linear gain characteristics;
A lack of requiring manual intervention (e.g., no potentiometers and/or adjustable constants); and
Fast and stable operation.

Two modes of the algorithm and methodology according to some preferred embodiments are described below. In the preferred embodiments, these modes meet the requirements by including, either explicitly or implicitly, the gain characteristics of the individual sensors (e.g., PMTs) within the algorithm itself. The preferred embodiments of the first mode acquire the gain characteristics by explicitly calibrating the system and storing the information in a predefined data structure, e.g., a look-up table (LUT). The preferred embodiments of the second mode determine the information it needs to tune the camera during the tuning process, without need for explicit calibrations.

According to some embodiments, a method for adaptive and/or predictive tuning of a multi-sensor imaging system includes: tuning individual sensors of a multi-sensor imaging system based explicitly or implicitly on gain characteristics of individual sensors of the multi-sensor imaging system so as to produce a uniform response over the system. In some embodiments, the method further includes treating each individual sensor individually based on its own pre-calibrated non-linear response so as to allow for changes in gain for sensors concurrently without problems related to linear approximations.

In some embodiments, non-linear gain responses involve gain versus high voltage and/or gain versus control-dynode DAC (digital-to-analog converter) setting (PMT gain can be changed by adjusting the voltages for the dynodes instead of changing the total high voltage between the anode and the photocathode, which may cause a significant signal transit-time variation that cannot be accepted by an application with a critical timing requirement, such as positron emission tomography (PET) or time-of-flight (TOF) detection/PET. The dynode voltage can be controlled by a digital-analog converter isolated with a linear optocoupler; alternately both the dynode voltages and the high voltage may be adjusted).

In some embodiments, the method further includes performing an integral mode algorithm including acquiring the gain characteristics by explicitly calibrating non-linear gain responses of each sensor and storing information related thereto in a data structure, such as, e.g., a look-up table (LUT). In some embodiments, the method further includes performing the steps of:

a) acquiring spectra at a given set of PMT voltage control values;
b) determining gain changes required to move to a tuned state; and
c) determining PMT voltage control values required to produce the desired gain changes;
d) modifying PMT voltage control values;
e) acquiring new spectra; and
f) repeating at least some of the forgoing steps until the system is tuned.

In some embodiments, the method further includes computing PMT voltage control values from response curves and/or their inverses.

In yet other embodiments, the method further includes performing a differential mode algorithm including determining information needed to tune the sensors during a tuning process, without need for explicit calibrations. In some examples, the method further includes approximating a change in gain versus PMT voltage control value as linear based on individual gain versus PMT voltage control value curves.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 2(A) to 2(C) and FIGS. 3(A) to 3(B) show a third order polynomial for each PMT dynode gain and a second order polynomial for the HV response of each PMT, wherein FIG. 2(C) shows Cubic Fit to Average of 3" PMT Gains, while

DETAILED DESCRIPTION OF THE INVENTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Illustrative Architecture

Figure 4:
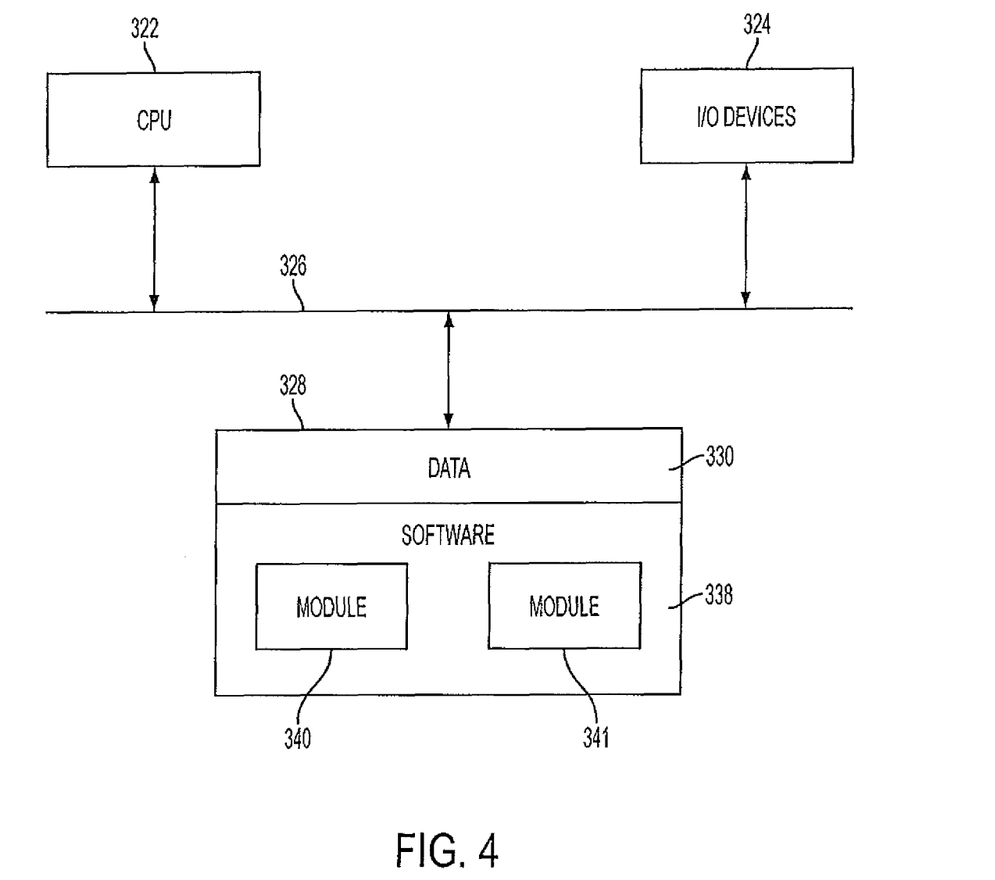
FIG. 4 shows an illustrative computer architecture that can be used to implement computerized process steps in some embodiments of the invention.

Various embodiments described herein include the implementation of algorithm or process steps, which can be carried out using, e.g., a computer or other data processing device. In this regard, FIG. 4 shows an illustrative computer architecture that can be used to implement computerized process steps in some embodiments of the invention. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 and 341 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via an interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

The Preferred Embodiments

In the preferred embodiments, a novel algorithm and methodology is provided that enables the "tuning" of the individual sensors of a multi-sensor imaging system in order to, among other things, produce a more uniform response over the entire system. In the preferred embodiments, the methodologies are implemented within a gamma ray imaging system that includes an array of photomultiplier tubes (PMTs). However, in various other embodiments, the algorithm and methodology can be employed in other environments. In this regard, concepts of the present invention are generalized and can be applied in other applications.

In preferred embodiments, it is needed that the gains of the individual photomultiplier tubes be adjusted in such a way as to produce the same or substantially the same total energy signal over the entire or substantially the entire imaging area of the camera. In some preferred embodiments, an algorithm is employed that has, e.g., the following characteristics:

An ability to work with PMTs with widely varying, non-linear gain characteristics;

A lack of requiring manual intervention (e.g., no potentiometers and/or adjustable constants); and Fast and stable operation.

Two modes of the algorithm and methodology according to some preferred embodiments are set forth below. In the preferred embodiments, these modes meet the requirements by including, either explicitly or implicitly, the gain characteristics of the individual PMTs within the algorithm itself. The preferred embodiments of the first mode acquire the gain characteristics by explicitly calibrating the system and storing the information in, e.g., a look-up table (LUT). The preferred embodiments of the second mode determine the information it needs to tune the camera during the tuning process, without need for explicit calibrations.

In illustrative examples described, the non-linear gain responses are of two types:

1) PMT gain vs. High Voltage (RV) (common to all sensors of the camera);
2) PMT gain vs. control-dynode DAC setting (specific to each PMT)—In this regard, each PMT has a set of dynodes whose inter-dynode potentials can be varied to adjust relative gain.

Further, the preferred embodiments described herein include the following illustrative species or embodiments of the invention:

Predictive Tuning Embodiments
   a. Integral Tuning examples of predictive tuning embodiments.
   b. Differential examples of predictive tuning embodiments.

Adaptive Tuning Embodiments
   a. Integral Tuning examples of adaptive tuning embodiments.
   b. Differential examples of adaptive tuning embodiments.

Predictive Tuning

Integral Mode

In some of the preferred embodiments, an algorithm is employed that includes a first ("integral") mode as set forth below. Here, the first ("integral") mode of the algorithm preferably explicitly calibrates the non-linear gain response of each PMT and stores it in a data structure (e.g. a look-up table (LUT)). In some preferred embodiments, a tuning process includes the following general steps:

1. Acquiring spectra at a given set of DAC values (e.g., PMT dynode and high voltage (HV) control values);
2. Determining gain changes required to move the system to the tuned state;
3. Determining DAC values required to produce the desired gain changes;
4. Modifying the DAC values;
5. Acquiring new spectra; and
6. Repeating until the system is tuned.

Figure 2A:
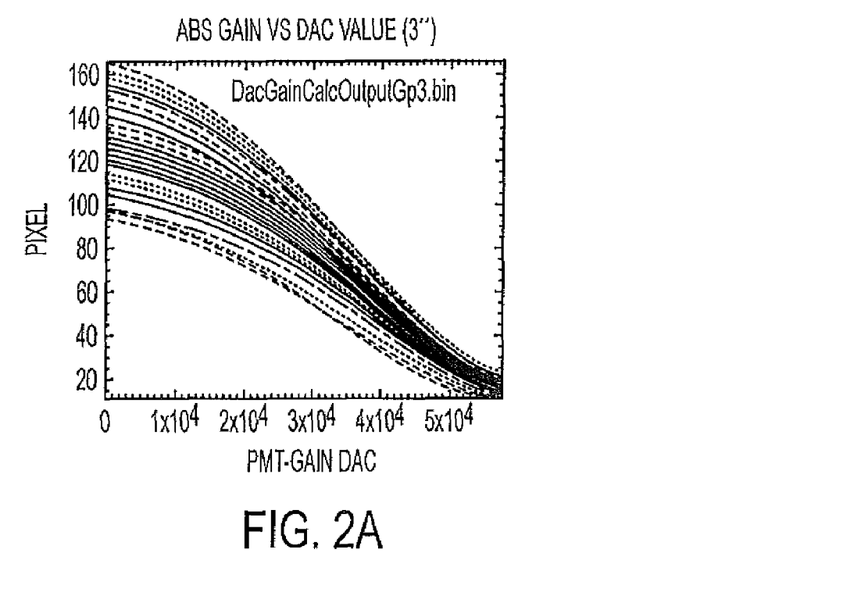
FIG. 2(A) shows Absolute Gain vs. PMT voltage control (i.e., DAC) Value (3" PMT)
Figure 2B:
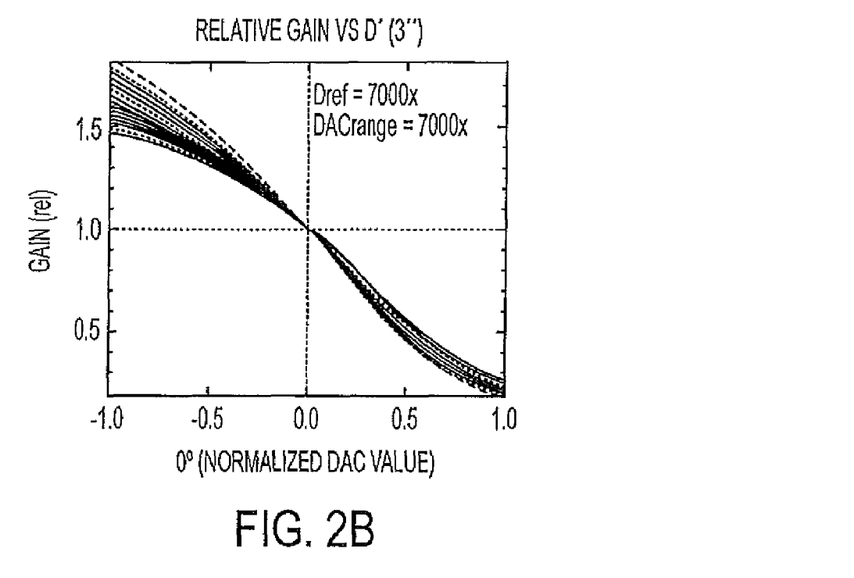
FIG. 2(B) shows Relative Gain vs. D' (normalized DAC value)
Figure 2C:
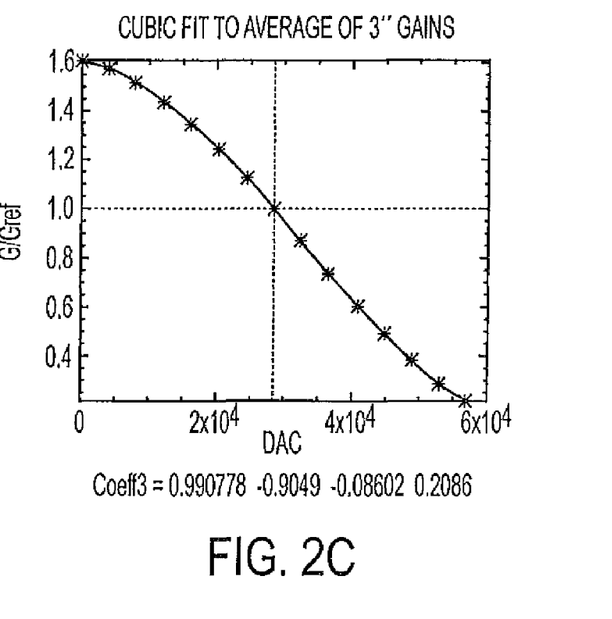
Figure 3A:
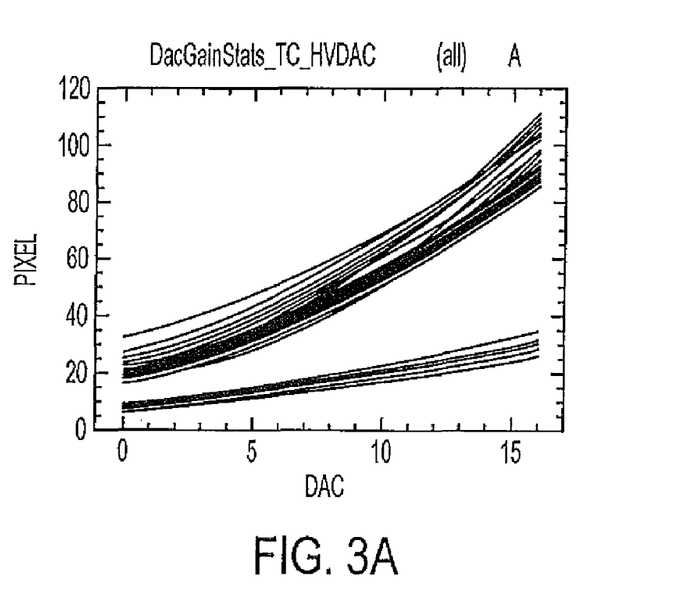
FIG. 3(A) shows all DAC Gain Stats TC HVDAC and FIG. 3(B) shows FWD Fit to Average of 3" PMT Gains.
Figure 3B:
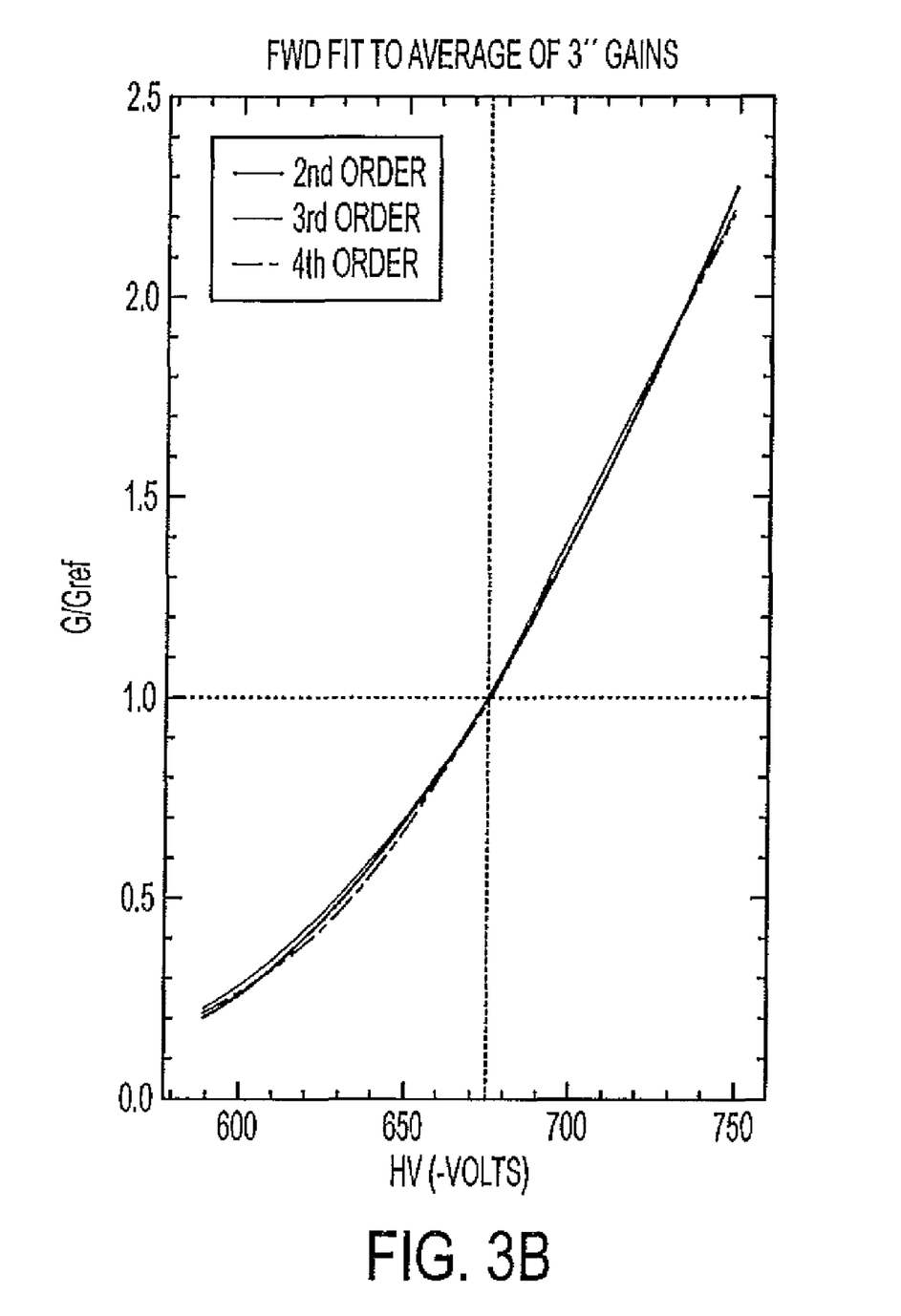

In the integral mode, the DAC values required to produce a desired gain can be computed directly from the response curves and their inverses. In this regard, reference is made to FIGS. 2(a) to 2(c) and FIGS. 3(a) to 3(b). Here, in this illustrative case, the curves are represented by a third order polynomial for each PMT dynode gain and a second order polynomial for the HV response of each PMT. In particular, FIG. 2(a) shows Absolute Gain vs. DAC Value (3" PMT), FIG. 2(b) shows Relative Gain vs. D' (normalized DAC value), and FIG. 2(c) shows Cubic Fit to Average of 3" PMT Gains, while FIG. 3(a) shows DAC Gain vs. Pixels for all HV DAC values, and FIG. 3(b) shows FWD Fit to Average of 3" PMT Gains.

In the preferred embodiments, given a desired percentage change in PMT dynode or HV gain, dg:

(e.g. $dg=\Delta G/G=0.10=10\%$).

a first tuning algorithm includes the following:
Compute desired gain change factor, gf:

$gf=1+dg$.

Compute current (relative) gain, G, at current DAC value, D:

$G=D\_G(D)$, where D_G is the calibrated DAC-to-Gain response function (see, e.g., FIGS. 2(a)-(c) and/or FIGS. 3(a)-(b)).
Compute the new gain G', and the new DAC, D':

$G'=gf \cdot G$, $D'=G\_D(G')$, where G_D is the inverse of D_G.

Among other things, this mode treats each PMT individually based on its pre-calibrated non-linear response. This allows large changes in gain for all PMTs simultaneously without problems of oscillation or slow convergence characteristic of linear approximations.

Differential Mode

In other preferred embodiments, when the PMT gains are close to their desired values and each PMT is operating in a limited region of its GD curve, a simplified "differential" approach is adequate. In some embodiments, the change in gain vs. DAC value can then be approximated as linear using, e.g., a local slope, $\alpha$, of the individual gain vs. DAC curves.

$\alpha = -\partial G/\partial DAC$ $\Delta G \approx -\alpha \cdot \Delta DAC$ $dg=\Delta G/G = -\alpha/G \cdot \Delta DAC$ $\Delta DAC = (\Delta G/G)/(-G/\alpha)$ $\Delta DAC = \beta \cdot \Delta G/G$ $\beta = [(1/G) \cdot \partial G/\partial DAC]^{-1}$ Here, physically, Beta ($\beta$) represents the fractional change in gain per unit DAC value change. In some preferred embodiments, individual values of $\beta$ can be calculated from the Gain DAC curves, such as, e.g., that shown in FIGS. 2(a)-(c) and FIGS. 3(a)-(b).

Self-Adaptive Tuning

In the Predictive Tuning Mode above, the PMT set is calibrated (see, e.g., FIGS. 2(a)-(c) and FIGS. 3(a)-(b)), and both integral and differential modes of the algorithm are adaptive by construction to the stored individual PMT characteristics. However, in order to calibrate the PMTs in the first place, they have to be brought to an initial tuned state.

In a Self-Adaptive Tuning Mode of the invention, a "generic" curve for dynode gains and another for high voltage gains is preferably used (see, e.g., the "average" curves in FIGS. 2(a)-(c) and FIGS. 3(a)-(b)). The gain factor computed from the generic (e.g., average) curves will now differ the gain factor of the actual "True" curve appropriate to any given PMT, and is optimized through an iterative process.

Integral Mode

In some embodiments, the ratio of the measured fractional change in gain to the change in gain predicted by the generic response curves is defined as the excess gain factor:

$Xgf = dg_M/dg_G = (\Delta G/G)_{Observed}/(\Delta G/G)_{Predicted}$.

This quantity can be determined from the acquired tune data during the tune process (e.g., at iteration i) and used to improve the gain estimate of the next iteration (i+1).

$dg_{i+1}[eft] \approx dg_{i+1}[Generic]/Xgf_i$

For example, if the observed gain change for iteration i is 10% high, the calculated gain change for iteration i+1 is reduced by a factor 1.10. It can be shown that the excess gain factor is equal to the ratio of the fractional change in gain per unit. DAC change ($\beta$) for the "true" PMT response curve to that of the generic:

$Xgf = \beta(true)/\beta(generic)$ $Xgf = [(1/G_T) \partial G_T/\partial DAC]/[(1/G_G) \partial G_G/\partial DAC]$ For coarse tuning, which determines gain changes directly from peak location ($Z_i$) in the PMT spectra for iteration i $\Delta G/G = \Delta Z/Z$ $= (Z_i - Z_{i-1})/Z_{i-1}$.

For fine tuning, which determines gain changes from observed peak location (E) in the $E_{Sum}$ spectra, $\Delta G/G = C^{-1} \# \Delta E/E$ $\Delta G/G$ and $\Delta E/E$, the fractional change in observed energy and gain, are, e.g., 59-element column vectors. Here, $C^{-1}$ is the inverse contribution matrix and # implies matrix multiplication.

Differential Mode

The value of $\beta$ required to compute new DAC values in differential mode can be determined empirically by solving the linearized DAC-to-gain equation for $\beta$ and using the observed (rather than predicted) values of gain changes, $dg = (\partial G/G)_{Observed}$ from the previous iteration.

$DAC_{i+1} = DAC_i + \Delta DAC_i$.

$\Delta DAC_i = \beta_i \cdot dg_i$.

$\beta_i \approx \Delta DAC_i/(\Delta G/G)_i^{Observed}$.

$\Delta DAC_i = (DAC_i - DAC_{i-1})$ ($\Delta G/G)^i$=observed change in gain from iteration $i$-1 to iteration $i$ For coarse tuning, which determines gain changes directly from peak location ($Z_i$) in the PMT spectra for iteration i:

$(\Delta G/G)_{Observed} = \Delta Z/Z$
$= (Z_i - Z_{i-1})/Z_{i-1}$
$(\Delta G/G)_{Predicted} = (Z_{Target} - Z_{i-1})/Z_{i-1}$ where $Z_{Target}$ and $Z_i$ are the desired and actual Peak locations for the ith iteration. In the case of fine tuning, which determines gain changes from observed peak location (E) in the $E_{Sum}$ spectra, the $E_{Sum}$ data are coupled through the system contribution matrix.

$$(\Delta G/G)_{Observed} = C^{-1} \# (\Delta E/E)_{Observed}$$

$\Delta G/G$ and $\Delta E/E$ are 59-element column vectors. $\Delta E/E$ is the fractional change in observed energy and gain, are 59-element column vectors. $C^{-1}$ is the inverse contribution matrix and $\#$ implies matrix multiplication.

$$dg = (\Delta G/G)_{Predicted} = C^{-1} \# (\Delta E/E)_{Predicted}$$

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The invention claimed is:

1. A method for tuning a nuclear imaging system having a plurality of nuclear radiation sensors, comprising:
 a) exposing the sensors to nuclear radiation of known energy and location of origin;
 b) using individual sensor responses to said nuclear radiation, determining sensor gain changes required to adjust the system sensors toward a previously determined tuned state;
 c) using the sensor gain changes determined in step b), determining sensor gain control values required to produce desired gain changes;
 d) modifying the sensor gain control values in accordance with the sensor gain control values determined in step c); and
 e) repeating steps a) through d) until the previously determined tuned state is achieved,
 wherein said sensor gain changes determined in step b) are modified in subsequent iterations of said steps based on an excessive gain factor $Xgf = (\Delta G/G)_{Observed} / (\Delta G/G)_{Predicted}$,
 wherein $(\Delta G/G)_{Predicted}$ is determined from a generic gain response curve,
 wherein said sensors comprise photomultiplier tubes, said gain control values comprise DAC values, and updated DAC values $DAC_{i+1}$ are determined as $DAC_{i+\Delta DACi}$, where $\Delta DAC_i = \beta_i \cdot dg$ and $\beta_i$ has been empirically determined from a previous iteration $\beta_i \approx \Delta DAC_i / (\Delta G/G)_{i\ Observed}$.

2. The method of claim 1, wherein $(\Delta G/G)_{Observed}$ is determined based on changes in peak location $Z_i$ as $(\Delta G/G)_{Observed} = (Z_i - Z_{i-1})/Z_{i-1}$.

3. The method of claim 1, wherein $(\Delta G/G)_{Observed}$ is determined based on changes in observed peak locations (E) in an $E_{Sum}$ spectra, such that $(\Delta G/G)_{Observed}$ is determined as $C^{-1} \# (\Delta E/E)_{Observed}$, where $\Delta G/G$ and $\Delta E/E$ are column vectors, $C^{-1}$ is an inverse contribution matrix, and $\#$ indicates matrix multiplication.

* * * * *